(12) United States Patent
Kato (10) Patent No.: US 7,754,391 B2
(45) Date of Patent: Jul. 13, 2010

(54) FUEL CELLS WITH MULTIDIRECTIONAL FUEL FLOW

(75) Inventor: Manabu Kato, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1151 days.

(21) Appl. No.: 10/569,419

(22) PCT Filed: Oct. 1, 2004

(86) PCT No.: PCT/JP2004/014909

§ 371 (c)(1),
(2), (4) Date: Feb. 23, 2006

(87) PCT Pub. No.: WO2005/034273

PCT Pub. Date: Apr. 14, 2005

(65) Prior Publication Data

US 2006/0257710 A1 Nov. 16, 2006

(30) Foreign Application Priority Data

Oct. 3, 2003 (JP) ............................... 2003-345331

(51) Int. Cl.
*H01M 8/24* (2006.01)
*H01M 8/04* (2006.01)

(52) U.S. Cl. ........................ 429/428; 429/400; 429/432; 429/443; 429/456; 429/545

(58) Field of Classification Search ........................ None
See application file for complete search history.

(56) References Cited

U.S. PATENT DOCUMENTS 3,709,736 A 1/1973 Adlhart et al.

(Continued)

FOREIGN PATENT DOCUMENTS

EP 0 971 428 A2 1/2000

(Continued)

*Primary Examiner*—Dah-Wei D Yuan
*Assistant Examiner*—Adam A Arciero
(74) *Attorney, Agent, or Firm*—Oliff & Berridge, PLC (57) ABSTRACT

In a stack of non-circulating-type fuel cells 20 where a supply of a fuel gas is not recirculated, a control circuit 50 sets a changeover valve assembly 41 in a disconnected state from both high-pressure hydrogen tanks 30 and outside of a cell stack body 21, while setting residual changeover valve assemblies 40, 42, and 43 in a connecting state to connect inside of the cell stack body 21 with the high-pressure hydrogen tanks 30. The supply of the fuel gas is accordingly fed into the stack of fuel cells 20 via the changeover valve assemblies 40, 42, and 43 and goes through electrochemical reactions. An impurity-containing gas after the electrochemical reactions is accumulated in the vicinity of a connection port 22. The control circuit 50 then sets the changeover valve assembly 41 in a connecting state to connect the inside of the fuel cells 20 with the outside and discharge the impurity-containing gas to the outside of the fuel cells 20. The control circuit 50 sequentially changes over the changeover valve assemblies 40 to 43 to the connecting state and thereby prevents the impurity-containing gas from being accumulated in the vicinity of any specific connection port. This arrangement desirably restrains potential deterioration of power generation performances of fuel cells and enhances the durability of the fuel cells.

5 Claims, 7 Drawing Sheets

U.S. PATENT DOCUMENTS

| | | |
|---|---|---|
| 4,444,851 A | 4/1984 | Maru |
| 5,344,721 A * | 9/1994 | Sonai et al. .......... 429/20 |
| 6,277,511 B1 | 8/2001 | Iwase et al. |
| 6,322,914 B1 * | 11/2001 | Chow et al. .......... 429/13 |
| 2002/0041984 A1 | 4/2002 | Chow et al. |
| 2002/0127444 A1 | 9/2002 | James et al. |
| 2003/0082433 A1 | 5/2003 | Sano et al. |
| 2004/0038114 A1 | 2/2004 | Wariishi et al. |

FOREIGN PATENT DOCUMENTS

| | | |
|---|---|---|
| JP | A-2-51866 | 2/1990 |
| JP | A-2000-348745 | 12/2000 |
| JP | A-2000-030730 | 1/2001 |
| JP | A-2001-250568 | 9/2001 |
| JP | A-2003-077506 | 3/2003 |
| JP | A-2003-142133 | 5/2003 |

* cited by examiner

FUEL CELLS WITH MULTIDIRECTIONAL FUEL FLOW

FIELD OF THE INVENTION

The present invention relates to a fuel cell including only one unit cell, as well as to a stack of fuel cells including multiple unit cells laid one upon another.

DESCRIPTION OF THE RELATED ART

There are two typical methods to feed a supply of a fuel gas (hydrogen-rich gas) to fuel cells. The first method is a circulating-type supply that the fuel gas fed to fuel electrodes or anodes to go through electrochemical reactions is recirculated to the anodes. The second method is a non-circulating-type supply that the fuel gas fed to the anodes is not recirculated to the anodes.

The non-circulating-type fuel cells do not require any piping structures and pumps for recirculation of the fuel gas to the anodes. This leads to size reduction of a fuel cell system.

In the prior art non-circulating-type fuel cells, sufficient power generation is performed in unit cells in an area from an inlet to the approximate center of the fuel gas flow path, while unit cells in an area close to the outlet of the fuel gas flow path have a relatively little contribution to power generation. The unit cells in the area from the inlet to the approximate center of the fuel gas flow path accordingly supplement the insufficient power generation by the unit cells in the area close to the outlet of the fuel gas flow path. This leads to thermal deterioration of the anodes (fuel electrodes) and cathodes (air electrodes) of the unit cells in the area from the inlet to the approximate center of the fuel gas flow path, as well as deterioration of the catalyst and carrier in the cathodes of the unit cells in the area close to the outlet of the fuel gas flow path.

The increasing power generation raises the reaction heat in the unit cells and thermally deteriorates or decomposes the material of the anode electrodes. This is the thermal deterioration of the cathodes and the anodes. This problem arises in both the unit cell structure and the stack structure of multiple unit cells.

An increase in potential of the cathodes in the unit cells in the area close to the outlet of the fuel gas flow path having a little contribution to power generation causes electrochemical damages of the cathodes. This is the deterioration of the catalyst and the carrier in the cathodes. Convection of nitrogen and water, which are transmitted from the cathodes, in the anodes forms a quasi internal cell. The electrons, which are originally to be flowed from the anodes to the cathodes, inversely run from the cathodes to the anodes in the stack structure of multiple unit cells. The electrons also run on the plane of the cathode and on the plane of the anode both in the unit cell structure and in the stack structure of multiple unit cells. Generation of electrons on the cathodes is required for such phenomena. The electrons are produced by reaction of carbon with water or by ionization of platinum. This results in consumption of carbon as the carrier and platinum as the catalyst on the cathodes.

DISCLOSURE OF THE INVENTION

The object of the invention is thus to restrain potential deterioration of power generation performances of non-circulating-type fuel cells where a supply of a fuel gas is not recirculated, as well as to enhance the durability of the fuel cells.

In order to attain at least part of the above and the other related objects, a first aspect of the present invention provides a stack of fuel cells, which are a fuel gas non-circulating-type where a supply of a fuel gas is not recirculated. The stack of fuel cells of the first aspect of the invention includes: a cell stack body that includes multiple unit cells laid one upon another and has a fuel gas flow path formed therein to make a flow of the fuel gas; multiple connection mechanisms that are provided with the cell stack body and function to connect the fuel gas flow path formed in the cell stack body with outside of the cell stack body and disconnect the fuel gas flow path in the cell stack body from the outside of the cell stack body; and a connection mechanism control module that selectively changes over the multiple connection mechanisms to a connecting state, when a preset condition is satisfied.

In the first aspect of the invention, under the preset condition, the multiple connection mechanisms provided with the cell stack body are selectively changed over to the connecting state to connect the fuel gas flow path formed in the cell stack body with the outside of the cell stack body. This selectively changes the flow direction of the fuel gas through the fuel gas flow path and accelerates diffusion of the fuel gas inside the cell stack body. This arrangement desirably restrains potential deterioration of power generation performances of the fuel cells and enhances the durability of the fuel cells.

In the first aspect of the invention, the selective changeover of the multiple connection mechanisms to the connecting state may be attained by setting at least one connection mechanism located downstream the fuel gas flow path in a connecting position. This arrangement activates the flow of the fuel gas in the fuel gas flow path and effectively discharges the fuel gas with a high content of impurities, which is accumulated downstream the fuel gas flow path, to the outside of the cell stack body.

A second aspect of the invention provides a stack of fuel cells, which are a fuel gas non-circulating-type where a supply of a fuel gas is not recirculated. The second stack of fuel cells of the second aspect of the invention includes: a cell stack body that includes multiple unit cells laid one upon another and has a fuel gas flow path formed therein to make a flow of the fuel gas; multiple connection mechanisms that are provided with the cell stack body and function to connect the fuel gas flow path formed in the cell stack body with either outside of the cell stack body or a fuel gas supply source and disconnect the fuel gas flow path in the cell stack body from both the outside of the cell stack body and the fuel gas supply source; and a connection mechanism control module that, in a normal operating condition, sets at least one connection mechanism among the multiple connection mechanisms in a disconnected state from both the outside of the cell stack body and the fuel gas supply source, while setting residual connection mechanisms in a connecting state with the fuel gas supply source. When a preset condition is satisfied, the connection mechanism control module changes over the at least one connection mechanism, which is set in the disconnected state from both the outside of the cell stack body and the fuel gas supply source, to connect the fuel gas flow path to the outside of the cell stack body.

In the second aspect of the invention, under the preset condition, among the multiple connection mechanisms provided with the cell stack body, the at least one connection mechanism set in the disconnected state from both the outside of the cell stack body and the fuel gas supply source is changed over to connect the fuel gas flow path with the outside of the cell stack body. Such changeover effectively activates the flow of the fuel gas in the cell stack body. A sufficient quantity of the fuel gas is thus fed to the cell stack body in the vicinity of the at least one connection mechanism, which is set in the disconnected state from both the outside of the cell stack body and the fuel gas supply source. This arrangement desirably restrains potential deterioration of power generation performances of the fuel cells and enhances the durability of the fuel cells.

In the second aspect of the invention, it is preferable that the connection mechanism control module sequentially selects different connection mechanisms as the at least one connection mechanism, which is set in the disconnected state from both the outside of the cell stack body and the fuel gas supply source, to be successively connected with the outside of the cell stack body. The embodiment of this structure sequentially selects the different connection mechanisms as the at least one connection mechanism, which is set in the disconnected state from both the outside of the cell stack body and the fuel gas supply source, to be connected with the outside of the cell stack body. This selectively changes the flow direction of the fuel gas through the fuel gas flow path and accelerates diffusion of the fuel gas inside the cell stack body. This arrangement desirably restrains potential deterioration of power generation performances of the fuel cells and enhances the durability of the fuel cells.

The first stack of fuel cells or the second stack of fuel cells may further include a voltage measurement unit that measures an output voltage. The preset condition is satisfied when the measured output voltage is less than a preset level. This structure estimates an increase in variation of the power generation among the respective unit cells. Such estimation is effectively usable to restrain potential deterioration of power generation performances of the fuel cells and enhance the durability of the fuel cells.

The first stack of fuel cells or the second stack of fuel cells also may further include multiple connection ports that connect an air flow path formed in the cell stack body with the outside of the cell stack body; multiple reference electrodes arranged respectively close to the multiple connection mechanisms and the multiple connection ports; and a determination module that determines an increase rate in potential measured by at least one of the reference electrodes. The preset condition is satisfied when the determination module determines that the increase rate in potential in a neighborhood of the at least one connection mechanism, which is set in the disconnected state from both the outside of the cell stack body and the fuel gas supply source, is not less than a preset level. This structure estimates an increase in potential of the cathode. Such estimation is effectively usable to restrain potential deterioration of power generation performances of the fuel cells and enhance the durability of the fuel cells.

In either of the first or second aspect of the invention, the preset condition is satisfied when a predetermined time period has elapsed since setting of the at least one connection mechanism in the disconnected state from both the outside of the cell stack body and the fuel gas supply source. This structure regularly varies the flow of the fuel gas in the cell stack body and sufficiently diffuses the fuel gas inside the cell stack body.

A third aspect of the invention provides a fuel cell, which is a fuel gas non-circulating-type where a supply of a fuel gas is not recirculated. The fuel cell of the third aspect of the invention has a membrane electrode assembly located between an anode separator and a cathode separator. This fuel cell further includes: a fuel gas passage defined by the anode separator and the membrane electrode assembly; multiple connection mechanisms that are formed in the anode separator and function to connect the fuel gas passage with outside of the fuel cell and disconnect the fuel gas passage from the outside of the fuel cell; and a connection mechanism control module that selectively changes over the multiple connection mechanisms to a connecting state, when a preset condition is satisfied.

The third aspect of the invention exerts the same functions and effects as those of the stack of fuel cells of the first aspect of the invention discussed above. The diverse arrangements adopted for the stack of fuel cells of the first aspect of the invention are also applicable to the fuel cell of the third aspect of the invention.

A fourth aspect of the invention provides a fuel cell, which is a fuel gas non-circulating-type where a supply of a fuel gas is not recirculated. The fuel cell of the fourth aspect of the invention has a membrane electrode assembly located between an anode separator and a cathode separator. This fuel cell further includes: a fuel gas passage defined by the anode separator and the membrane electrode assembly; multiple connection mechanisms that are formed in the anode separator and function to connect the fuel gas passage with either outside of the fuel cell or a fuel gas supply source and disconnect the fuel gas passage from both the outside of the fuel cell and the fuel gas supply source; and a connection mechanism control module that, in a normal operating condition, sets at least one connection mechanism among the multiple connection mechanisms in a disconnected state from both the outside of the fuel cell and the fuel gas supply source, while setting residual connection mechanisms in a connecting state with the fuel gas supply source. When a preset condition is satisfied, the connection mechanism control module changes over the at least one connection mechanism, which is set in the disconnected state from both the outside of the fuel cell and the fuel gas supply source, to connect the fuel gas passage to the outside of the fuel cell.

The fourth aspect of the invention exerts the same functions and effects as those of the stack of fuel cells of second aspect of the invention discussed above. The diverse arrangements adopted for the stack of fuel cells of the second aspect of the invention are also applicable to the fuel cell of the fourth aspect of the invention.

These and other objects, features, aspects, and advantages of the present invention will become more apparent from the following detailed description of the preferred embodiments with the accompanied drawings.

DESCRIPTION OF THE PREFERRED EMBODIMENTS

The fuel cells of the invention are described with some preferable embodiments with reference to the drawings.

A. First Embodiment

Figure 1:
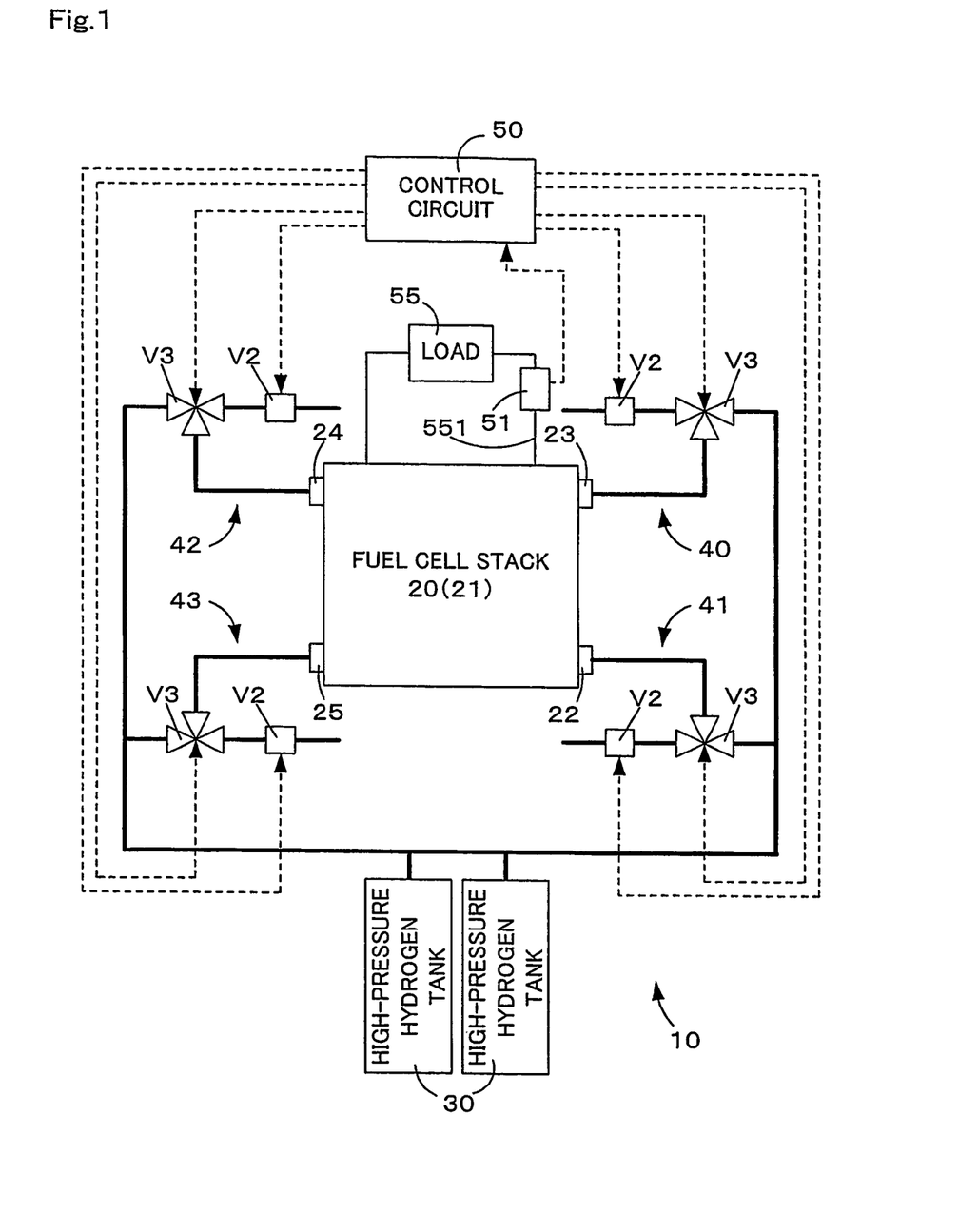
FIG. 1 schematically illustrates the configuration of a fuel cell system including a fuel cell stack 20 in a first embodiment of the invention.
Figure 2:
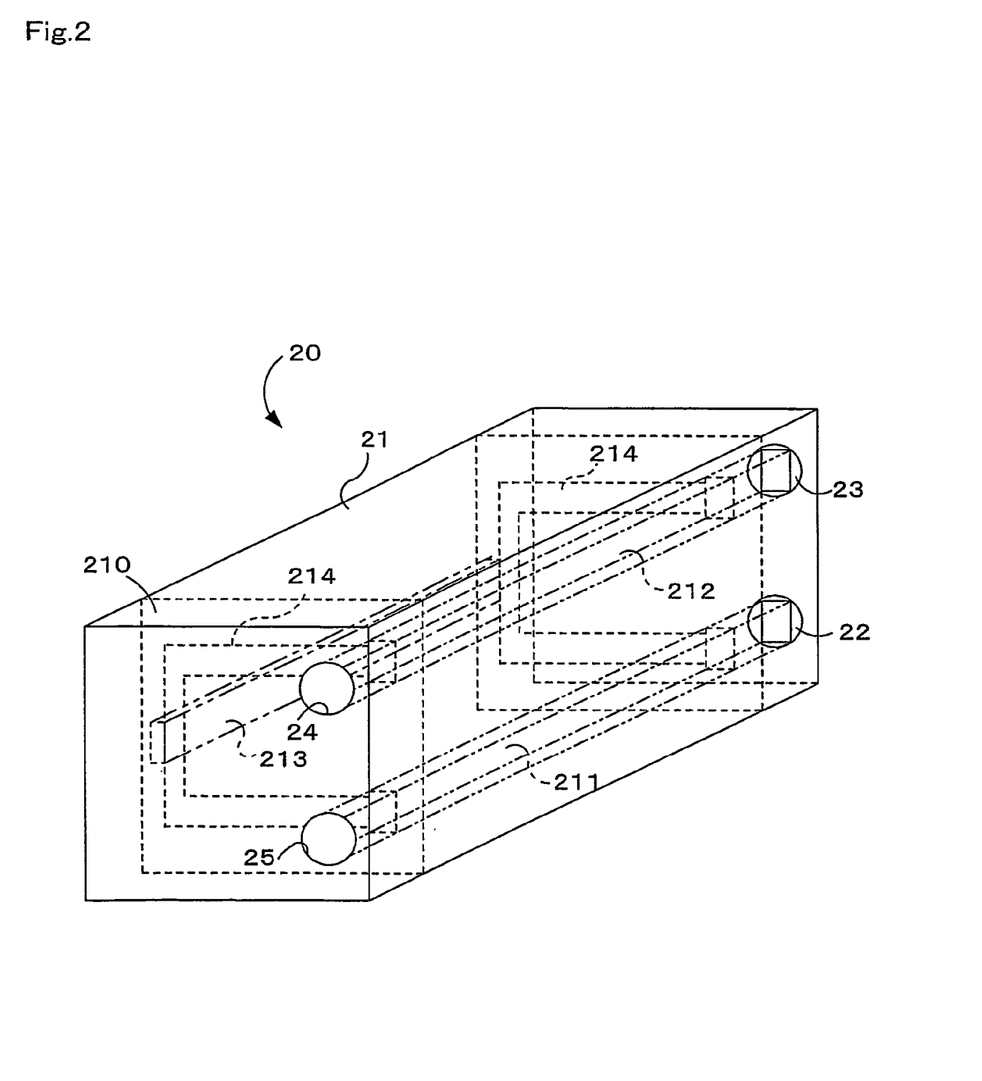
FIG. 2 schematically illustrates the internal structure of the fuel cell stack 20 in the first embodiment.

A fuel cell system including fuel cells is described as a first embodiment of the invention with reference to FIGS. 1 and 2. FIG. 1 schematically illustrates the configuration of a fuel cell system 10 including a fuel cell stack 20 in the first embodiment. FIG. 2 schematically illustrates the internal structure of the fuel cell stack 20 in the first embodiment.

The fuel cell system 10 of the first embodiment includes the fuel cell stack 20 of multiple unit cells laid one upon another, high-pressure hydrogen tanks 30 that store hydrogen gas to be supplied as a fuel gas to the fuel cello stack 20, and a control circuit 50 that controls changeover valve assemblies 40, 41, 42, and 43 provided for the fuel cell stack 20.

The fuel cell stack 20 has a cell stack body 21 of multiple unit fuel cells 210 as minimum units laid one upon another, and connection ports 22, 23, 24, and 25 connecting the inside of the cell stack body 21 with the outside. The unit fuel cell 210 typically includes a membrane-electrode assembly, which has a pair of electrodes arranged on both faces of an electrolyte membrane and is interposed between an anode separator and a cathode separator. As shown in FIG. 2, fuel gas flow paths 211, 212, and 213 for the flow of fuel gas are formed inside the cell stack body 21. The ends of the fuel gas flow paths 211 and 212 are connected with the connection ports 22, 23, 24, and 25.

The fuel cell stack 20 is constructed as non-circulating-type fuel cells, where the fuel gas flowing through the fuel gas flow paths 211, 212, and 213 and going through electrochemical reactions is not resupplied to the fuel gas flow paths 211, 212, and 213 (the fuel cell stack 20) but is discharged outside the fuel cell stack 20. A load 55 is linked to the fuel cell stack 20 as shown in FIG. 1. A voltage sensor 51 is located on a feed line 551 connecting the fuel cell stack 20 with the load 55 to measure the output voltage of the fuel cell stack 20.

The fuel gas flow paths 211, 212, and 213 are connected with intra-cell fuel gas passages 214 formed in the respective unit fuel cells 210. The fuel gas flows through the fuel gas flow paths 211, 212, and 213 and is led into the respective unit fuel cells 210 via the fuel gas passages 214.

The changeover valve assemblies 40, 41, 42, and 43 are respectively connected with the connection ports 23, 22, 24, and 25 of the fuel cell stack 20. In the structure of this embodiment, each of the changeover valve assemblies 40, 41, 42, and 43 has a three-way valve V3 and a two-way valve V2 for electromagnetic changeover between a connecting state and a disconnecting state. The changeover valve assemblies 40, 41, 42, and 43 function to selectively connect the fuel gas flow paths 211 and 212 formed in the cell stack body 21 with either the high-pressure hydrogen tanks 30 as fuel gas supply sources or the outside of the cell stack body 21 or disconnect the fuel gas flow paths 211 and 212 from both the high-pressure hydrogen tanks 30 and the outside of the cell stack body 21. In the normal operating conditions, one of the changeover valve assemblies 40, 41, 42, and 43 is disconnected from both the high-pressure hydrogen tanks 30 and the outside of the cell stack body 21, so that the fuel cell stack 20 works as the non-circulating-type fuel cells. The changeovers of the respective changeover valve assemblies 40, 41, 42, and 43 are determined by the driving conditions of the fuel cell system 10.

Although not specifically illustrated, the control circuit 50 includes a CPU that executes diverse series of operations, a ROM that stores changeover programs for the changeover valve assemblies 40, 41, 42, and 43 and diversity of other processing programs, and a RAM that temporarily stores the results of the operations by the CPU and various data. The control circuit 50 controls the operating conditions of the fuel cell system 10. Actuators (electromagnetic actuators) of the respective changeover valve assemblies 40, 41, 42, and 43 and the voltage sensor 51 are connected to the control circuit 50.

The description now regards the flow state of the fuel gas in the cell stack body of the fuel cell stack 20 with reference to FIG. 2. Here it is assumed that the connection port 22 is closed to make the fuel cell stack 20 work as the non-circulating-type fuel cells. In the closed position of the connection port 22, the changeover valve assembly 41 is disconnected from both the high-pressure hydrogen tanks 30 and the outside of the cell stack body 21.

The flow of fuel gas supplied from one of the high-pressure hydrogen tanks 30 is fed to the fuel gas flow paths 211 and 212 via the connection ports 23, 24, and 25. The fuel gas supplied to the fuel gas flow paths 211 and 212 flows through the intra-cell fuel gas passages 214 into the fuel gas flow path 213. The fuel gas is thus homogeneously fed to the respective unit fuel cells 210.

The fuel gas that has supplied to the fuel gas flow paths 211 and 212 but has not been flowed to the intra-cell fuel gas passages 214 or has flowed into the fuel gas flow path 213 eventually reaches the vicinity of the closed connection port 22. The fuel gas accumulated in the vicinity of the connection port 22 tends to have a relatively low hydrogen concentration and a large quantity of impurities including nitrogen.

Figure 3:
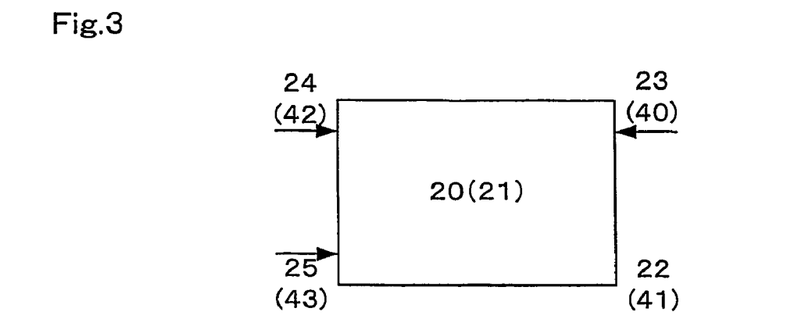
FIG. 3 shows a first flow state of the fuel gas in the fuel cell stack 20 in normal operating conditions.
Figure 4:
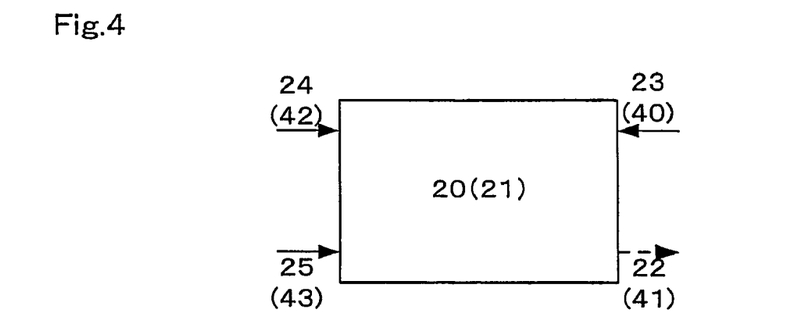
FIG. 4 shows a first flow state of the fuel gas and the impurity-containing gas in the fuel cell stack 20 in impurity-containing gas discharge conditions.
Figure 5:
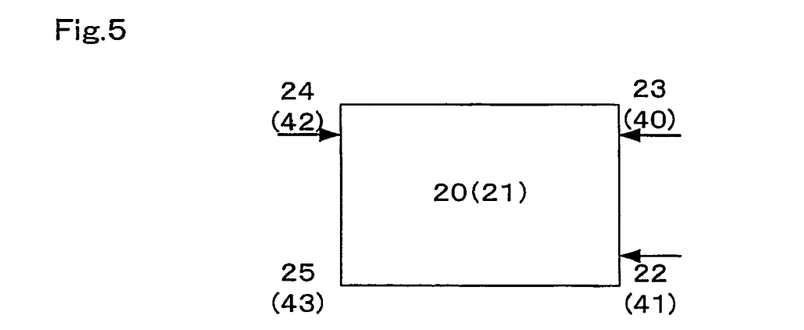
FIG. 5 shows a second flow state of the fuel gas in the fuel cell stack 20 in the normal operating conditions.
Figure 6:
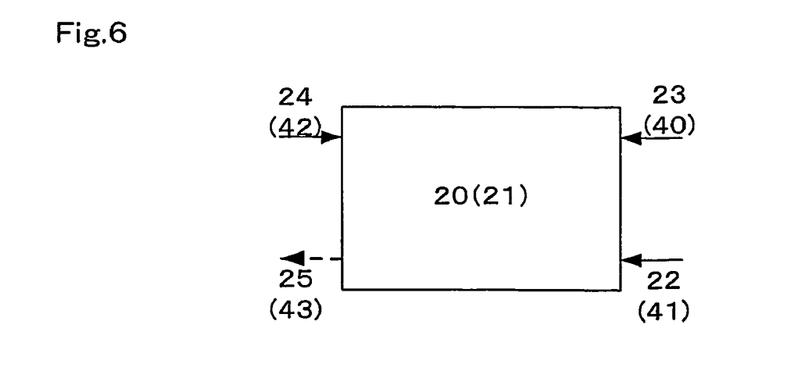
FIG. 6 shows a second flow state of the fuel gas and the impurity-containing gas in the fuel cell stack 20 in the impurity-containing gas discharge conditions.
Figure 7:
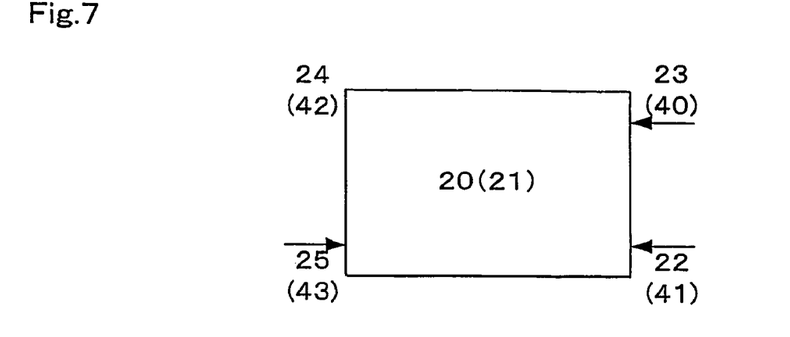
FIG. 7 shows a third flow state of the fuel gas in the fuel cell stack 20 in the normal operating conditions.
Figure 8:
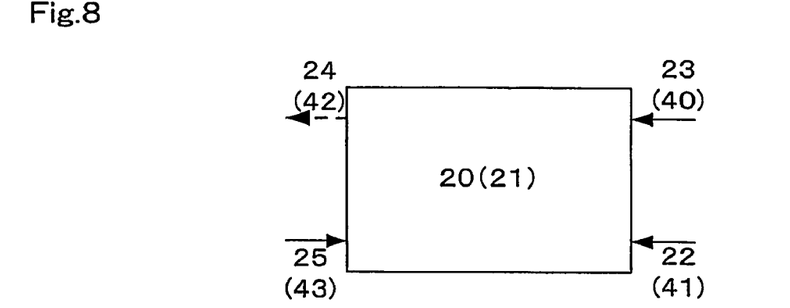
FIG. 8 shows a third flow state of the fuel gas and the impurity-containing gas in the fuel cell stack 20 in the impurity-containing gas discharge conditions.
Figure 9:
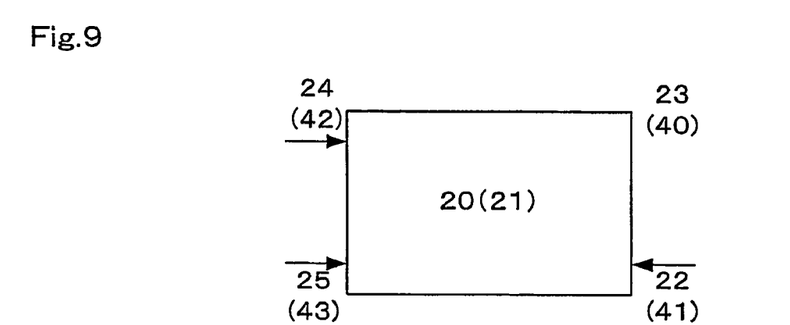
FIG. 9 shows a fourth flow state of the fuel gas in the fuel cell stack 20 in the normal operating conditions.
Figure 10:
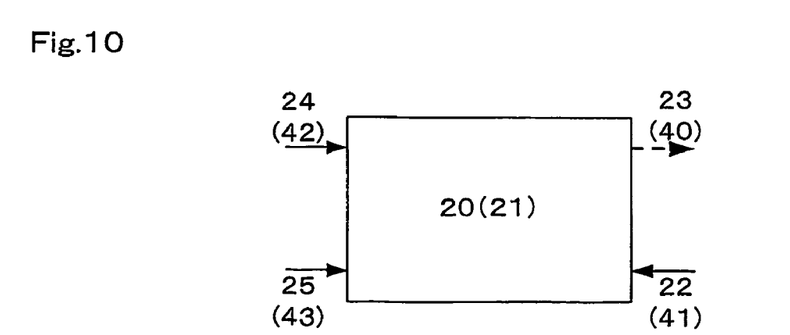
FIG. 10 shows a fourth flow state of the fuel gas and the impurity-containing gas in the fuel cell stack 20 in the impurity-containing gas discharge conditions.
Figure 11:
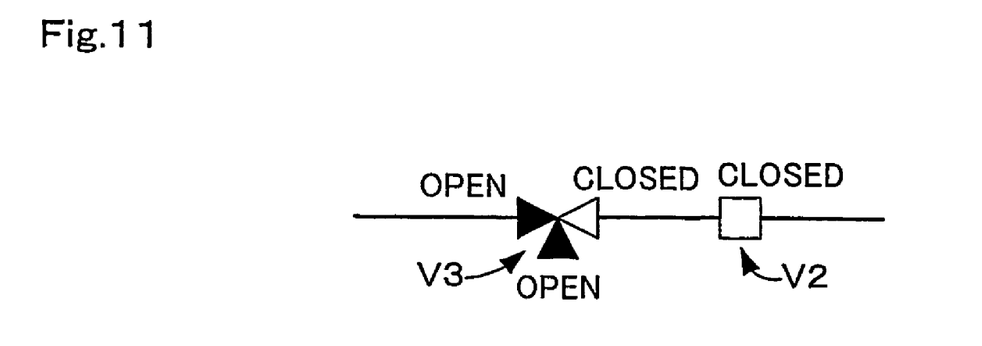
FIG. 11 shows a first operating state of a changeover valve assembly to feed a supply of the fuel gas in the normal operating conditions and in the impurity-containing gas discharge conditions.
Figure 12:
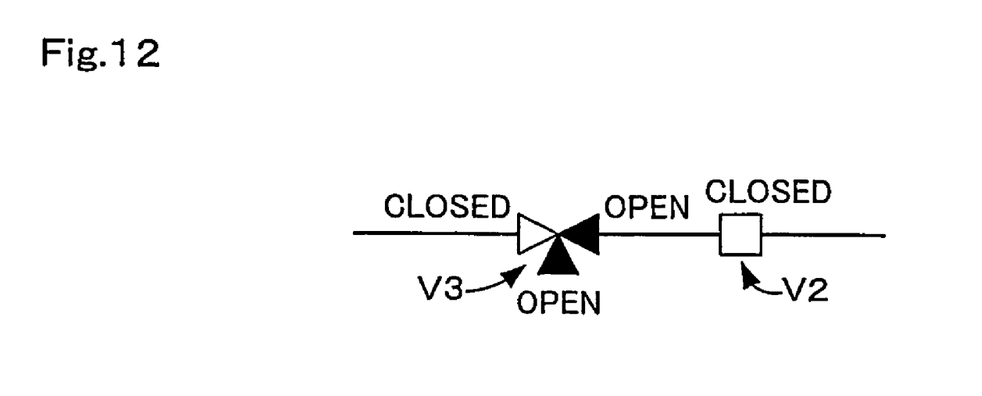
FIG. 12 shows a second operating state of the changeover valve assembly to discharge the impurity-containing gas in the normal operating conditions.
Figure 13:
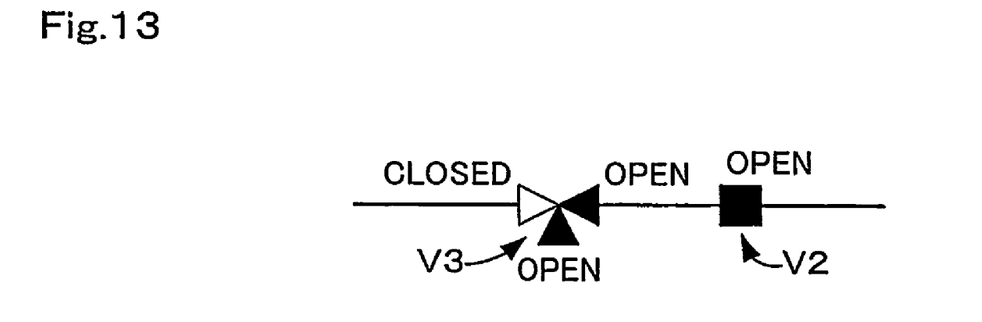
FIG. 13 shows a third operating state of the changeover valve assembly to discharge the impurity-containing gas in the impurity-containing gas discharge conditions.
Figure 14:
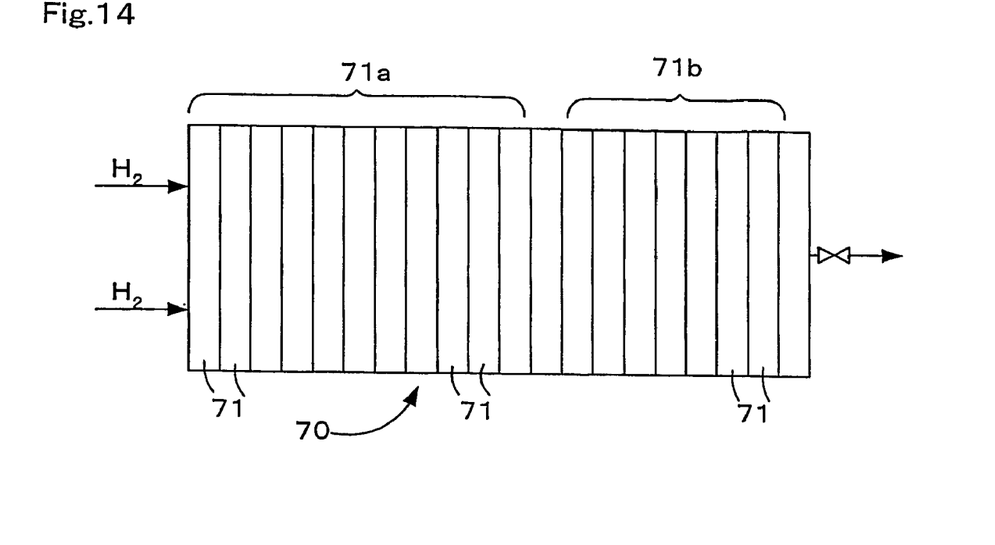
FIG. 14 shows a variation in contribution to power-generation among unit cells in a prior art fuel cell stack.

The flow states of the fuel gas and the impurity-containing gas in the fuel cell stack 20 of the first embodiment and the operating states of the changeover valve assemblies 40, 41, 42, and 43 are described below with reference to FIGS. 3 to 14. FIG. 3 shows a first flow state of the fuel gas in the fuel cell stack 20 in normal operating conditions. FIG. 4 shows a first flow state of the fuel gas and the impurity-containing gas in the fuel cell stack 20 in impurity-containing gas discharge conditions. FIG. 5 shows a second flow state of the fuel gas in the fuel cell stack 20 in the normal operating conditions. FIG. 6 shows a second flow state of the fuel gas and the impurity-containing gas in the fuel cell stack 20 in the impurity-containing gas discharge conditions. FIG. 7 shows a third flow state of the fuel gas in the fuel cell stack 20 in the normal operating conditions. FIG. 8 shows a third flow state of the fuel gas and the impurity-containing gas in the fuel cell stack 20 in the impurity-containing gas discharge conditions. FIG. 9 shows a fourth flow state of the fuel gas in the fuel cell stack 20 in the normal operating conditions. FIG. 10 shows a fourth flow state of the fuel gas and the impurity-containing gas in the fuel cell stack 20 in the impurity-containing gas discharge conditions. FIG. 11 shows a first operating state of a changeover valve assembly to feed a supply of the fuel gas in the normal operating conditions and in the impurity-containing gas discharge conditions. FIG. 12 shows a second operating state of the changeover valve assembly to discharge the impurity-containing gas in the normal operating conditions. FIG. 13 shows a third operating state of the changeover valve assembly to discharge the impurity-containing gas in the impurity-containing gas discharge conditions. FIG. 14 shows a variation in contribution to power generation among unit cells in a prior art fuel cell stack.

At the initial stage of normal operation, the control circuit 50 sets the changeover valve assembly 41 in the second operating state (see FIG. 12) to disconnect the changeover valve assembly 41 from both the high-pressure hydrogen tanks 30 and the outside of the cell stack body 21, while setting the other changeover valve assemblies 40, 42, and 43 in the first operating state (see FIG. 11) to connect the fuel gas flow paths 211 and 212 formed in the cell stack body 21 with the high-pressure hydrogen tanks 30. The flow of the fuel gas in the fuel cell stack 20 is accordingly set in the first flow state shown in FIG. 3. The fuel gas is supplied through the changeover valve assemblies 40, 42, and 43, goes through the electrochemical reactions, and is accumulated in the vicinity of the connection port 22 (the changeover valve assembly 41). The fuel gas accumulated in the vicinity of the connection port 22 has a low hydrogen concentration and a relatively large quantity of impurities including nitrogen and water.

When the output voltage of the fuel cell stack 20 measured by the voltage sensor 51 is lowered below a preset level, the control circuit 50 detects the necessity of discharge of the impurity-containing gas and sets the changeover valve assembly 41 in the third operating state (see FIG. 13) to connect the fuel gas flow path 211 in the cell stack body 21 with the outside of the cell stack body 21. The output voltage of the fuel cell stack 20 is accordingly lowered with an increase in quantity of the impurities, such as nitrogen and water, which are transmitted through the electrolyte membrane from the cathode side to the anode side. The impurity-containing gas accumulated in the vicinity of the connection port 22 is then discharged to the outside of the cell stack body 21, for example, to the atmosphere, as shown in FIG. 4.

After a preset time period has elapsed since the changeover of the changeover valve assembly 41 to the third operating state, the control circuit 50 sets the changeover valve assembly 43 in the second operating state (see FIG. 12) to disconnect the changeover valve assembly 43 from both the high-pressure hydrogen tanks 30 and the outside of the cell stack body 21, while setting the other changeover valve assemblies 40, 41, and 42 in the first operating state (see FIG. 11) to connect the fuel gas flow paths 211 and 212 formed in the cell stack body 21 with the high-pressure hydrogen tanks 30. This sets the driving state of the fuel cell stack 20 to the normal driving conditions. The flow of the fuel gas in the fuel cell stack 20 is accordingly set in the second flow state shown in FIG. 5. The fuel gas is supplied through the changeover valve assemblies 40, 41, and 42, goes through the electrochemical reactions, and is accumulated in the vicinity of the connection port 25 (the changeover valve assembly 43). The fuel gas accumulated in the vicinity of the connection port 25 has a low hydrogen concentration and a relatively large quantity of impurities including nitrogen and water.

When the output voltage of the fuel cell stack 20 measured by the voltage sensor 51 is lowered below the preset level, the control circuit 50 detects the necessity of discharge of the impurity-containing gas and sets the changeover valve assembly 43 in the third operating state (see FIG. 13) to connect the fuel gas flow path 211 in the cell stack body 21 with the outside of the cell stack body 21. The impurity-containing gas accumulated in the vicinity of the connection port 25 is then discharged to the outside of the cell stack body 21, for example, to the atmosphere, as shown in FIG. 6.

After a preset time period has elapsed since the changeover of the changeover valve assembly 43 to the third operating state, the control circuit 50 sets the changeover valve assembly 42 in the second operating state (see FIG. 12) to disconnect the changeover valve assembly 42 from both the high-pressure hydrogen tanks 30 and the outside of the cell stack body 21, while setting the other changeover valve assemblies 40, 41, and 43 in the first operating state (see FIG. 11) to connect the fuel gas flow paths 211 and 212 formed in the cell stack body 21 with the high-pressure hydrogen tanks 30. This sets the driving state of the fuel cell stack 20 to the normal driving conditions. The flow of the fuel gas in the fuel cell stack 20 is accordingly set in the third flow state shown in FIG. 7. The fuel gas is supplied through the changeover valve assemblies 40, 41, and 43, goes through the electrochemical reactions, and is accumulated in the vicinity of the connection port 24 (the changeover valve assembly 42). The fuel gas accumulated in the vicinity of the connection port 24 has a low hydrogen concentration and a relatively large quantity of impurities including nitrogen and water.

When the output voltage of the fuel cell stack 20 measured by the voltage sensor 51 is lowered below the preset level, the control circuit 50 detects the necessity of discharge of the impurity-containing gas and sets the changeover valve assembly 42 in the third operating state (see FIG. 13) to connect the fuel gas flow path 212 in the cell stack body 21 with the outside of the cell stack body 21. The impurity-containing gas accumulated in the vicinity of the connection port 24 is then discharged to the outside of the cell stack body 21, for example, to the atmosphere, as shown in FIG. 8.

After a preset time period has elapsed since the changeover of the changeover valve assembly 42 to the third operating state, the control circuit 50 sets the changeover valve assembly 40 in the second operating state (see FIG. 12) to disconnect the changeover valve assembly 40 from both the high-pressure hydrogen tanks 30 and the outside of the cell stack body 21, while setting the other changeover valve assemblies 41, 42, and 43 in the first operating state (see FIG. 11) to connect the fuel gas flow paths 211 and 212 formed in the cell stack body 21 with the high-pressure hydrogen tanks 30. This sets the driving state of the fuel cell stack 20 to the normal driving conditions. The flow of the fuel gas in the fuel cell stack 20 is accordingly set in the fourth flow state shown in FIG. 9. The fuel gas is supplied through the changeover valve assemblies 41, 42, and 43, goes through the electrochemical reactions, and is accumulated in the vicinity of the connection port 23 (the changeover valve assembly 40). The fuel gas accumulated in the vicinity of the connection port 23 has a low hydrogen concentration and a relatively large quantity of impurities including nitrogen and water.

When the output voltage of the fuel cell stack 20 measured by the voltage sensor 51 is lowered below the preset level, the control circuit 50 detects the necessity of discharge of the impurity-containing gas and sets the changeover valve assembly 40 in the third operating state (see FIG. 13) to connect the fuel gas flow path 212 in the cell stack body 21 with the outside of the cell stack body 21. The impurity-containing gas accumulated in the vicinity of the connection port 22 is then discharged to the outside of the cell stack body 21, for example, to the atmosphere, as shown in FIG. 10.

The control circuit 50 sequentially repeats the four patterns discussed above. Instead of the measured output voltage of the fuel cell stack 20, an empirically determined reference time may be used for detection of the necessity of discharge of the impurity-containing gas. The necessity of discharge may otherwise be determined according to an increase rate or a decrease rate of voltage measured by reference electrodes located in the respective unit fuel cells 210.

As described above, the fuel cell stack 20 of the first embodiment sequentially shifts the changeover valve assembly to discharge the impurity-containing gas. Such sequential shift successively changes the accumulation area of the impurity-containing gas (that is, the position of the closed connection port). This arrangement desirably prevents the impurity-containing gas from being accumulated in a fixed area of the fuel cell stack 20, thus restraining potential deterioration of the power generation performances of the fuel cell stack 20 and enhancing the durability of the fuel cell stack 20.

The successive change of the accumulation area of the impurity-containing gas fully diffuses the fuel gas over the whole area of the fuel cell stack 20 and enables all the unit fuel cells 210 included in the fuel cell stack 20 to evenly generate electric power. This arrangement desirably eliminates the drawback of the prior art structure of a fuel cell stack 70 shown in FIG. 14. In the prior art structure of FIG. 14, upstream unit fuel cells 71a (that is, unit cells in an area from the inlet to the approximate center) among all the unit fuel cells 71a of the fuel cell stack 70 mainly contribute to power generation, while downstream unit fuel cells 71b (that is, unit cells in an area close to the outlet) make only a little contribution to power generation. The arrangement of the embodiment effectively prevents potential damage of the anodes and the cathodes in the upstream unit fuel cells (in the area from the inlet to the center) due to a high reaction heat by the excessive reaction (power generation), as well as potential damage of the cathodes in the downstream unit fuel cells (in the area close to the outlet) due to electrochemical reactions with an increase in potential.

In the structure of the first embodiment, each of the connection ports 22 to 25 is one hole having both the function of feeding the fuel gas and discharging the impurity-containing gas. This desirably simplifies the structure of the cell stack body 21 and the fuel gas flow paths 211, 212, and 213, while reducing the total size of the fuel cell stack 20.

B. Second Embodiment

Figure 15:
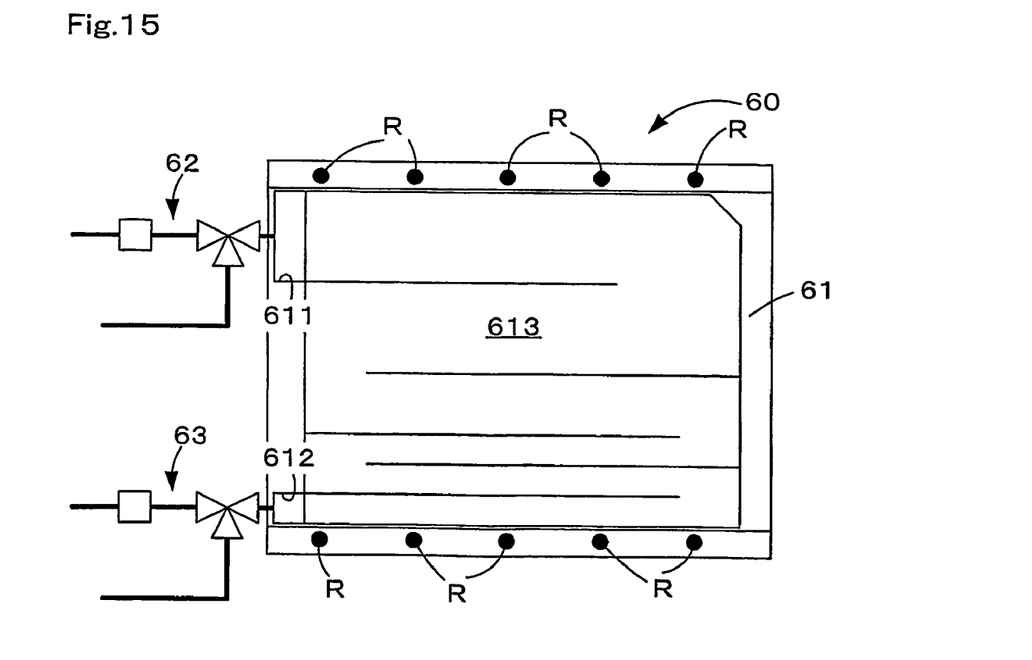
FIG. 15 schematically illustrates the internal structure of a fuel cell 60 (separator 61) in a second embodiment of the invention.
Figure 16:
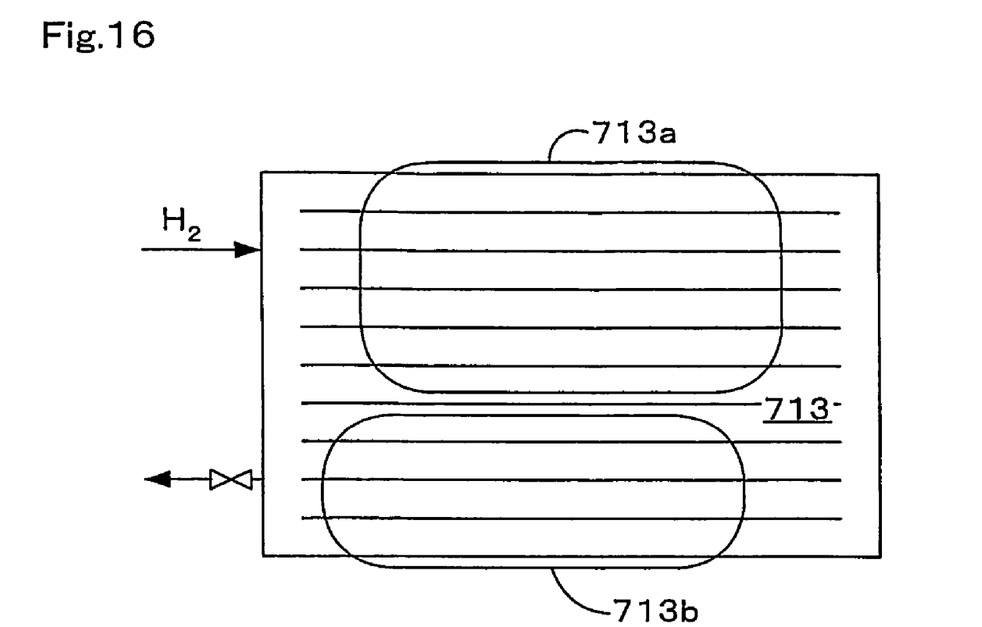
FIG. 16 shows a variation in power generation area as a drawback of a prior art fuel cell (unit cell).

A fuel cell 60 in a second embodiment of the invention is described below with reference to FIGS. 15 and 16. FIG. 15 schematically illustrates the internal structure of the fuel cell 60 in the second embodiment. FIG. 16 shows a variation in power generation area as a drawback of a prior art fuel cell (unit cell).

The fuel cell 60 of the second embodiment has only one unit cell. The potential damage of the electrode catalyst due to a difference in contribution to power generation is not the unique problem arising in a stack of fuel cells having a difference between upstream unit fuel cells and downstream unit fuel cells, but also arises in an intra-cell fuel gas passage formed in the unit cell.

The fuel cell 60 of the second embodiment includes a separator 61 having two inlet/outlet ports 611 and 612 and an intra-cell fuel gas passage 613 that interconnects the two inlet/outlet ports 611 and 612 to make a flow of the fuel gas supplied from a high-pressure hydrogen tank. Reference electrodes R for measuring the potential are located in the intra-cell fuel gas passage 613 close to the respective inlet/outlet ports 611 and 612 in the separator 61. The fuel cell 60 also has changeover valve assemblies 62 and 63, which selectively connect the intra-cell fuel gas passage 613 with either the outside of the fuel cell 60 or the high-pressure hydrogen tank or disconnect the intra-cell fuel gas passage 613 from both the outside of the fuel cell 60 and the high-pressure hydrogen tank.

At the initial stage of normal operation, the changeover valve assembly 62 is connected with the high-pressure hydrogen tank, whereas the changeover valve assembly 63 is disconnected from both the outside of the fuel cell 60 and the high-pressure hydrogen tank. Continuous operation in this state causes the impurity-containing gas to be accumulated in an area of the intra-cell fuel gas passage 613 in the vicinity of the inlet/outlet port 612. Such accumulation raises the potential measured by the reference electrodes R located close to the inlet/outlet port 612.

When an increase rate of the potential measured by the reference electrodes R (that is, a potential increase rate per unit time) exceeds a preset level, the changeover valve assembly 63 is connected with the outside of the fuel cell 60 to discharge the impurity-containing gas accumulated in the vicinity of the inlet/outlet port 612 to the outside of the fuel cell 60.

The changeover valve assembly 63 is then connected with the high-pressure hydrogen tank, while the changeover valve assembly 62 is disconnected from both the outside of the fuel cell stack 60 and the high-pressure hydrogen tank. Continuous operation in this state causes the impurity-containing gas to be accumulated in an area of the intra-cell fuel gas passage 613 in the vicinity of the inlet/outlet port 611. Such accumulation raises the potential measured by the reference electrodes R located close to the inlet/outlet port 611.

When the increase rate of the potential measured by the reference electrodes R (that is, the potential increase rate per unit time) exceeds the preset level, the changeover valve assembly 62 is connected with the outside of the fuel cell 60 to discharge the impurity-containing gas accumulated in the vicinity of the inlet/outlet port 611 to the outside of the fuel cell 60.

These two patterns discussed above are sequentially repeated. The necessity of discharge of the impurity-containing gas may be detected according to the measured output voltage of the fuel cell 60 or according to an empirically determined reference time, instead of the increase rate of the potential measured by the reference electrodes R.

As described above, the fuel cell 60 of the second embodiment sequentially shifts the changeover valve assembly to discharge the impurity-containing gas. Such sequential shift successively changes the accumulation area of the impurity-containing gas on the separator 61 (electrode). This arrangement desirably prevents the impurity-containing gas from being accumulated in a fixed area of the fuel cell 60, thus restraining potential deterioration of the power generation performance of the fuel cell 60 and enhancing the durability of the fuel cell 60.

The successive change of the accumulation area of the impurity-containing gas fully diffuses the fuel gas over the whole area of the fuel cell 60 (the intra-cell fuel gas passage 613) and enables the whole area of the fuel cell 60 to evenly generate electric power. This arrangement desirably eliminates the drawback of the prior art structure of a fuel cell shown in FIG. 16. In the prior art structure of FIG. 16, only an upstream area 713$a$ (that is, an area from the inlet to the approximate center) of an intra-cell fuel gas passage 713 mainly contributes to power generation, while a downstream area 713$b$ (that is, an area close to the outlet) makes only a little contribution to power generation. The arrangement of the second embodiment effectively prevents potential damage of the anode and the cathode in the area from the inlet to the center due to a high reaction heat by the excessive reaction (power generation), as well as potential damage of the cathode in the area close to the outlet due to electrochemical reactions with an increase in potential.

C. Modifications

In the structure of the first embodiment, the connection ports 22 to 25 are formed in parallel with the vertical sides on the transverse sections of the fuel cell stack 20. The connection ports may have a three-dimensional arrangement, for example, may be located diagonally on the transverse section.

The configuration of the fuel gas flow paths 211 and 212 in the fuel cell stack 20 of the first embodiment is only illustrative and not restrictive at all. The fuel gas flow paths may have any adequate arrangement, for example, a diagonal arrangement.

The fuel cell stack 20 (the cell stack body 21) of the first embodiment has the four connection ports 22 to 25. The number of the connection ports is not restrictive to 4, but may be any suitable value of not less than 2. Each of the connection ports 22 to 25 has both the function of supplying the fuel gas and the function of discharging the impurity-containing gas. Connection ports having only one of these functions may be arranged in pairs or separately. In this modified structure, each connection port is provided with a changeover valve assembly, which includes both a changeover valve for connecting the fuel gas flow path with the outside of the fuel cell 20 and a changeover valve for connecting the fuel gas flow path with the high-pressure hydrogen tank 30.

In the structure of the first embodiment, the connection ports 22 to 25 are formed on the opposing side faces of the fuel cell stack 20 (the cell stack body 21) to face each other in the horizontal direction. The connection ports may otherwise be formed on the front face and the rear face of the fuel cell stack 20 to face each other in the horizontal direction or formed on the top face and the bottom face of the fuel cell stack 20 to face each other in the vertical direction. The connection ports may be arranged both in the horizontal direction and in the vertical direction. The fuel gas flow paths 211, 212, and 213 formed in the cell stack body 21 are only illustrative and not restrictive at all. The fuel gas flow paths may be extended either in the horizontal direction or in the vertical direction. Plural fuel gas flow paths may be arranged to cross over each other.

The configuration of the intra-cell fuel gas passage 613 in the separator 61 in the structure of the second embodiment is only illustrative and not restrictive at all. The fuel gas passage may have any of diverse structures, for example, a facing structure.

In the structure of the second embodiment, the connection ports 611 and 612 are formed on one side face of the fuel cell 60. The connection ports may be formed on opposing side faces to face each other in the horizontal direction. The connection ports may otherwise be formed on at least one of the bottom face and the top face to face each other in the horizontal direction or in the vertical direction. The connection ports may be formed in both a vertically extending face and a horizontally extending face. The configuration of the intra-cell fuel gas passage 613 is only illustrative and not restrictive at all. The intra-cell fuel gas passage may have a single flow path or plural flow paths and may be extended either in the horizontal direction or in the vertical direction.

The embodiments and their modified examples discussed above are to be considered in all aspects as illustrative and not restrictive. There may be many modifications, changes, and alterations without departing from the scope or spirit of the main characteristics of the present invention. All changes within the meaning and range of equivalency of the claims are intended to be embraced therein. The scope and spirit of the present invention are indicated by the appended claims, rather than by the foregoing description.

The invention claimed is:

1. A stack of fuel cells being a fuel gas non-circulating-type where a supply of a fuel gas is not recirculated, said stack of fuel cells comprising:

a cell stack body that includes multiple unit cells laid one upon another and has a fuel gas flow path formed therein to make a flow of the fuel gas;

multiple connection mechanisms that are provided with the cell stack body and function to connect the fuel gas flow path formed in the cell stack body with either outside of the cell stack body or a fuel gas supply source and disconnect the fuel gas flow path in the cell stack body from both the outside of the cell stack body and the fuel gas supply source; and a connection mechanism control module that, in a normal operating condition, sets at least one connection mechanism among the multiple connection mechanisms in a disconnected state from both the outside of the cell stack body and the fuel gas supply source, while setting residual connection mechanisms in a connecting state with the fuel gas supply source, when impurities accumulate, said connection mechanism control module changing over the at least one connection mechanism, which is set in the disconnected state from both the outside of the cell stack body and the fuel gas supply source, to connect the fuel gas flow path to the outside of the cell stack body, wherein the connection mechanism control module sequentially selects different connection mechanisms as the at least one connection mechanism, which is set in the disconnected state from both the outside of the cell stack body and the fuel gas supply source, to be successively connected with the outside of the cell stack body, and each fuel cell is driven with the supply of the fuel gas kept inside in the normal operating condition.

2. A stack of fuel cells in accordance with claim 1, said stack of fuel cells further comprising:

a voltage measurement unit that measures an output voltage, wherein a preset condition is satisfied when the measured output voltage is less than a preset level.

3. A stack of fuel cells in accordance with claim 1, said stack of fuel cells further comprising:

multiple connection ports that connect an air flow path formed in the cell stack body with the outside of the cell stack body;

multiple reference electrodes arranged respectively close to the multiple connection mechanisms and the multiple connection ports; and a determination module that determines an increase rate in potential measured by at least one of the reference electrodes, wherein impurities are accumulated when the determination module determines that the increase rate in potential of the at least one connection mechanism, which is set in the disconnected state from both the outside of the cell stack body and the fuel gas supply source, is not less than a preset level.

4. A stack of fuel cells in accordance with claim 1, wherein impurities are accumulated when a predetermined time period has elapsed since setting of the at least one connection mechanism in the disconnected state from both the outside of the cell stack body and the fuel gas supply source.

5. A fuel cell being a fuel gas non-circulating-type where a supply of a fuel gas is not recirculated, said fuel cell having a membrane electrode assembly located between an anode separator and a cathode separator, said fuel cell further comprising:

a fuel gas passage defined by the anode separator and the membrane electrode assembly;

multiple connection mechanisms that are formed in the anode separator and function to connect the fuel gas passage with either outside of the fuel cell or a fuel gas supply source and disconnect the fuel gas passage from both the outside of the fuel cell and the fuel gas supply source; and a connection mechanism control module that, in a normal operating condition, sets at least one connection mechanism among the multiple connection mechanisms in a disconnected state from both the outside of the fuel cell and the fuel gas supply source, while setting residual connection mechanisms in a connecting state with the fuel gas supply source, when impurities accumulate, said connection mechanism control module changing over the at least one connection mechanism, which is set in the disconnected state from both the outside of the fuel cell and the fuel gas supply source, to connect the fuel gas passage to the outside of the fuel cell, wherein the connection mechanism control module sequentially selects different connection mechanisms as the at least one connection mechanism, which is set in the disconnected state from both the outside of the fuel cell and the fuel gas supply source, to be successively connected with the outside of the fuel cell, and the fuel cell is driven with the supply of the fuel gas kept inside in the normal operating condition.

* * * * *